United States Patent
Shah-Nazaroff et al.

(10) Patent No.: US 9,027,053 B2
(45) Date of Patent: *May 5, 2015

(54) METHOD AND APPARATUS FOR CUSTOMIZED RENDERING OF COMMERCIALS

(75) Inventors: Anthony A. Shah-Nazaroff, Santa Clara, CA (US); Jean M. Goldschmidt Iki, San Jose, CA (US); Kenneth A. Moore, BenLomond, CA (US); David N. Hackson, Sunnyvale, CA (US); Eric O. Smith, Scotts Valley, CA (US)

(73) Assignee: Intel Corporation, Santa Clara, CA (US)

( * ) Notice: Subject to any disclaimer, the term of this patent is extended or adjusted under 35 U.S.C. 154(b) by 2698 days.

This patent is subject to a terminal disclaimer.

(21) Appl. No.: 10/354,337

(22) Filed: Jan. 30, 2003

(65) Prior Publication Data

US 2003/0149976 A1   Aug. 7, 2003

Related U.S. Application Data

(63) Continuation of application No. 09/183,487, filed on Oct. 30, 1998, now Pat. No. 6,671,880.

(51) Int. Cl.
| | |
|---|---|
| *H04N 7/10* | (2006.01) |
| *H04N 7/025* | (2006.01) |
| *H04N 7/16* | (2011.01) |
| *H04H 20/10* | (2008.01) |
| *H04H 60/46* | (2008.01) |
| *H04H 60/65* | (2008.01) |
| *H04N 21/258* | (2011.01) |
| *H04N 21/458* | (2011.01) |
| *H04N 21/81* | (2011.01) |

(52) U.S. Cl.
CPC ............. *H04N 7/165* (2013.01); *H04H 20/106* (2013.01); *H04H 60/46* (2013.01); *H04H 60/65* (2013.01); *H04N 21/25891* (2013.01); *H04N 21/458* (2013.01); *H04N 21/812* (2013.01)

(58) Field of Classification Search
USPC ....................................... 725/32–36
See application file for complete search history.

(56) References Cited

U.S. PATENT DOCUMENTS

| | | | |
|---|---|---|---|
| 4,602,279 | A | 7/1986 | Freeman |
| 5,155,591 | A | 10/1992 | Wachob |
| 5,446,919 | A | 8/1995 | Wilkins |
| 5,515,098 | A | 5/1996 | Carles |
| 5,600,364 | A | 2/1997 | Hendricks et al. |
| 5,610,653 | A | 3/1997 | Abecassis |

(Continued)

OTHER PUBLICATIONS

PCT International Search Report for International Application PCT/US99/25517 dated Oct. 1999.

(Continued)

*Primary Examiner* — Gigi L Dubasky
(74) *Attorney, Agent, or Firm* — Blakely, Sokoloff, Taylor & Zafman LLP

(57) ABSTRACT

An entertainment system receives entertainment programming interposed with commercials. The entertainment system selectively renders the commercial in accordance with characteristics associated with a user of the entertainment programming. In one embodiment, the entertainment system selectively renders a selected one among multiple received versions of a commercial. In another embodiment, the entertainment system selectively renders a selected one among multiple received commercials.

33 Claims, 5 Drawing Sheets

(56) References Cited

U.S. PATENT DOCUMENTS

| | | | |
|---|---|---|---|
| 5,652,615 A | | 7/1997 | Bryant et al. |
| 5,724,521 A | | 3/1998 | Dedrick |
| 5,758,257 A | * | 5/1998 | Herz et al. .................... 725/116 |
| 5,758,259 A | | 5/1998 | Lawler |
| 5,774,170 A | * | 6/1998 | Hite et al. ...................... 725/34 |
| 5,848,397 A | | 12/1998 | Marsh et al. |
| 5,913,040 A | * | 6/1999 | Rakavy et al. ................ 709/232 |
| 6,002,393 A | * | 12/1999 | Hite et al. .................... 715/719 |
| 6,029,045 A | * | 2/2000 | Picco et al. ..................... 725/34 |
| 6,128,712 A | | 10/2000 | Hunt et al. |
| 6,698,020 B1 | * | 2/2004 | Zigmond et al. ................ 725/34 |
| 2009/0177303 A1 | * | 7/2009 | Logan et al. ................... 700/94 |

OTHER PUBLICATIONS

Supplementary EPO Search Report, PCT/US9925517, Dec. 4, 2002, 5 pages.

* cited by examiner

METHOD AND APPARATUS FOR
CUSTOMIZED RENDERING OF
COMMERCIALS

CROSS REFERENCE TO RELATED APPLICATIONS

This continuation application claims the benefit of U.S. patent application Ser. No. 09/183,487 for Method and Apparatus for Customized Rendering of Commercials, to inventors Shah-Nazaroff, Goldschmidt Iki, Moore, Hackson and Smith, Assignee Intel Corporation, filed Oct. 30, 1998 now U.S. Pat. No. 6,671,880.

BACKGROUND OF THE INVENTION

1. Field of the Invention

The present invention pertains to the field of entertainment systems. More particularly, the present invention relates to the rendering of commercials interposed in, entertainment programming.

2. Background

Commercials have long been an integral part of entertainment programming. From the major television networks to the local radio station operators, they all rely on advertisers for their revenues. As a result, the large majority of entertainment programming, whether it is television or radio, whether it is news, sports, soap operas or talk shows, they are all interposed with commercials at selective breakpoints of the programs. Even for video tapes, more and more commercials are placed at the beginning as well as the end of the feature presentations. Under the prior art, subject to the users changing channel or programming source, the commercials are rendered by the receiving entertainment systems as received. This conventional "as is" approach to commercial rendering suffers from at least one disadvantage in that all viewers/listeners of an entertainment program see/hear the same commercial, which often is of interest to only a small percentage of the viewers/listeners of the entertainment program (even though they had the common interest of watching/listening to the same entertainment program).

A recent trend in the electronics and computer industry is the convergence of computer systems and more traditional entertainment system components. Accompanying this convergence is the expansion in the types and the capacities of the transport media (i.e., the mechanism or pipe through which the entertainment programs are delivered to the entertainment systems), as well as the local abilities in processing and rendering the entertainment programs and their associated information. While analog broadcasts and analog cable were once the standard transport media for television and audio programming, high capacity digital cable and digital satellite systems are becoming more and more commonplace. Other transport media, such as digital broadcasts, are starting to appear as options for viewers/listeners. Additionally, other "local" sources (e.g., video cassette recorders or CD players) can also supply entertainment programming to the user. As a result, increasing number of entertainment programs are available to the viewers/listeners from increasing number of different channels/sources, making it even more tempting for the viewers/listeners with little interest in the commercials to at least skip to other programming while the commercials are being rendered.

Obviously, this is of concerns to the advertisers, but it is a concern to the program providers/broadcasters also. As it is well established, often times, the viewers/listeners will stay with the other program. The conventional approach to increasing the likelihood of the viewers/listeners staying tuned to watch/listen to the commercials is to increase the quality of the commercials. While this approach has proven to be somewhat effective, it has driven up the cost of the commercials, and in turn the cost of advertising. With the increased in cost, the advertisers are expecting a higher return to their investment.

Therefore, a need exist to improve the effectiveness of commercial rendering.

SUMMARY OF THE INVENTION

A method and apparatus for customized rendering of commercials is disclosed. The apparatus receives entertainment programming interposed with commercials. The apparatus selectively renders the commercials in accordance with characteristics associated with a user of the entertainment programming.

In one embodiment, the apparatus selectively renders a selected one among multiple received versions of a commercial. In another embodiment, the apparatus selectively renders a selected one among multiple received commercials.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

The description will be presented in a manner using terminology commonly employed by those skilled in the art to convey the substance of their work to others skilled in the art. Parts of the description will be presented in terms of operations performed by a computer system, using terms such as data, flags, bits, values, characters, strings, numbers and the like. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order the steps are presented.

Figure 1:
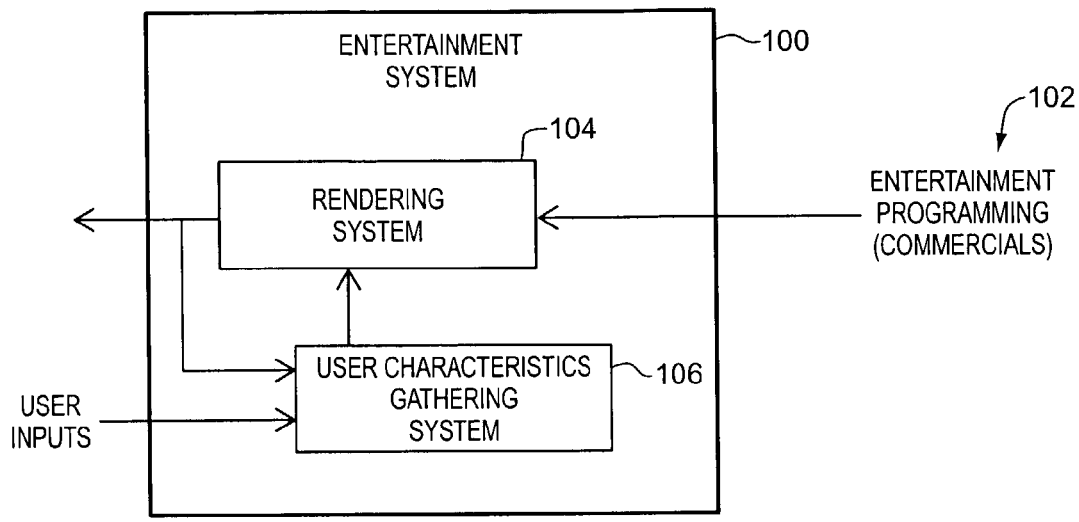
FIG. 1 is a block diagram illustrating an exemplary entertainment system incorporated with the teachings of the present invention.

Referring now FIG. 1, wherein a block diagram illustrating an overview of the present invention is shown. As illustrated, entertainment system 100 receives entertainment programming 102 interposed with commercials. In accordance with the present invention, entertainment system 100 selectively renders the interposed commercials in accordance with characteristics associated with a user of entertainment system 100. For the illustrated embodiment, entertainment system 100 includes rendering subsystem 104 and user characteristic gathering subsystem 106 operatively coupled to each other as shown.

Entertainment programming 102 is intended to represent a broad range of multimedia programming, including but not limited to publicly broadcast television and radio programming received through a number of transport media, such as AM/FM, VHF/UHF, cable, satellite and the like, as well as privately performed audio and video programming "retrieved" off a number of distribution media, such as tapes, diskettes, compact disks (CD), digital versatile disk (DVD), and the like.

Except for the teachings of the present invention incorporated, rendering subsystem 104 is intended to represent a wide range of components and circuitry commonly found in receivers/amplifiers, televisions, video cassette players, CD/DVD players, and the like. The operational flow of rendering subsystem 104 in accordance with the present invention will be described in more detail below with references to FIG. 2-4.

User characteristic gathering subsystem 106 is intended to also represent a broad range of such subsystems known in the art, including basic subsystems with rudimentary functions for statically gathering basic profile data such as age, sex, and other preference information from users of entertainment system 100, as well as advanced subsystems with sophisticated functions for dynamically gathering entertainment consumption habits, such as television viewing habits of the users of entertainment system 100. An example of such advanced subsystems is disclosed in U.S. patent application Ser. No. 08/866,707, filed on May 30, 1997, entitled "Method and Apparatus for Automatically Determining and Dynamically Updating User Preferences in an Entertainment System".

Figure 2:
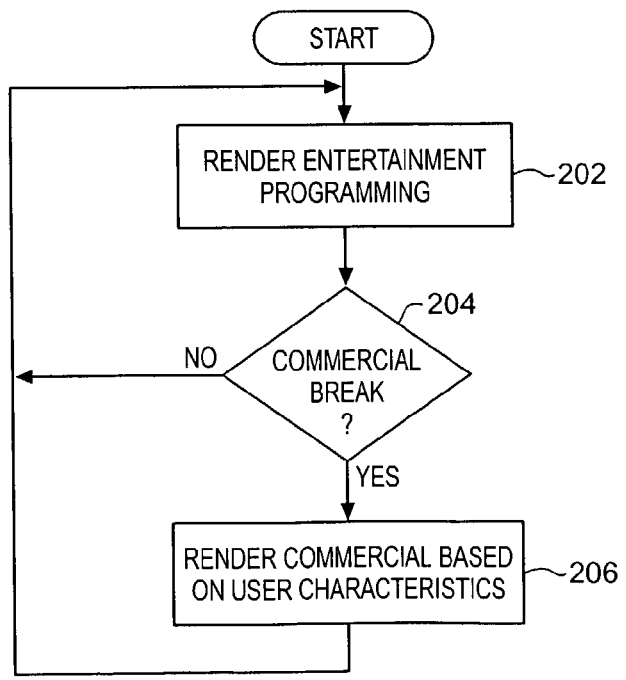
FIG. 2 is flow chart illustrating the operational flow of the rendering system of FIG. 1 in accordance with one embodiment of the present invention.

Referring now to FIG. 2, wherein a flow chart illustrating the operation flow of rendering subsystem 104 in accordance with one embodiment of the present invention is shown. At step 202, rendering subsystem 104 performs its conventional primary function of rendering an entertainment program. Additionally, in accordance with the present invention, rendering subsystem 104 continuously monitors for commercial breakpoints, step 204. If a commercial breakpoint is not detected, rendering subsystem 104 continues to perform its conventional primary function as described earlier. However, whenever a commercial breakpoint is detected, rendering subsystem 104 selectively renders the commercials based on user characteristics associated with the user, step 206.

Determination of commercial breakpoints may be achieved in a wide variety of manners. In one embodiment, entertainment programming 102 includes a signal denoting the beginning of a commercial period, and rendering subsystem 104 includes dedicated circuitry for monitoring for the special signal. Such dedicated circuitry are well within the ability of those skilled in the art; accordingly will not be further described. In an alternate embodiment, entertainment programming 102 includes embedded information, such as intercast or closed caption information embedded in the vertical blanking intervals of a television program, to explicitly denote or allow the start of a commercial period to be inferred, and rendering subsystem 104 includes the appropriate components for decoding the embedded information and ascertaining whether a commercial break period is about to start. Such components and decoding techniques are known in the art.

The user characteristics employed in performing the selective rendering are intended to include a wide range of characteristics, including but not limited to profile characteristics such as age, sex, and other demographic data, as well as consumption characteristics, such as preference to comedy or action titles, particular actors/actresses, directors/producers and so forth.

Figure 3:
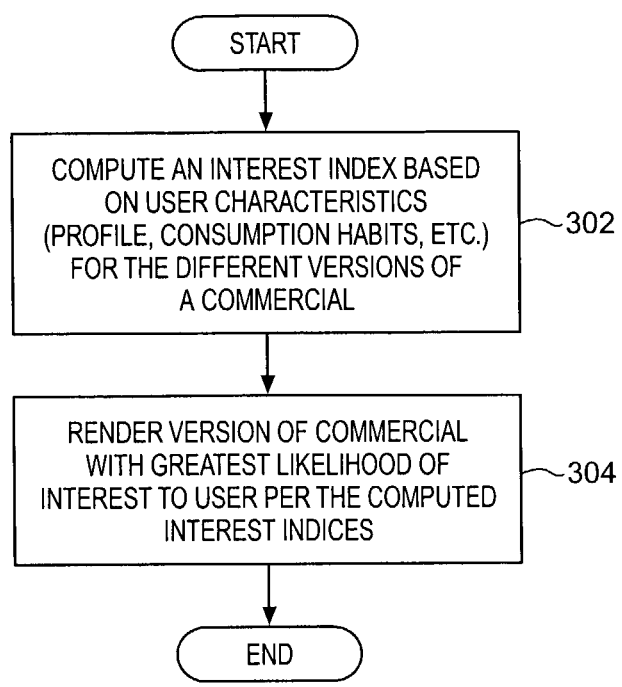
FIG. 3 is a flow chart illustrating the rendering step of FIG. 2 in further detail in accordance with one embodiment.

Referring now to FIG. 3, wherein a flow chart further illustrating step 206 in accordance with one embodiment of the present invention is shown. For the illustrated embodiment, selected ones of the interposed commercials are provided in multiple versions. For example, different versions are provided for different age, income, ethnic and/or viewing habit groups. Accordingly, for the illustrated embodiment, at step 302, rendering subsystem 104 computes an interest potential index for each of the different versions to predict the interest potential to the user, using user characteristics gathered and maintained by user characteristic subsystem 106. Then, at step 304, rendering subsystem 104 renders the version with the greatest likelihood of interest to the user, per the computed interest potential indices.

Various approaches may be employed to compute the interest potential indices. For example, in one embodiment, a simple unweighted scheme adding up the number of "matching" characteristics may be employed. In an alternate embodiment, a sophisticated predetermined probabilistic model using the various characteristics as input factors may be employed instead.

Figure 4:
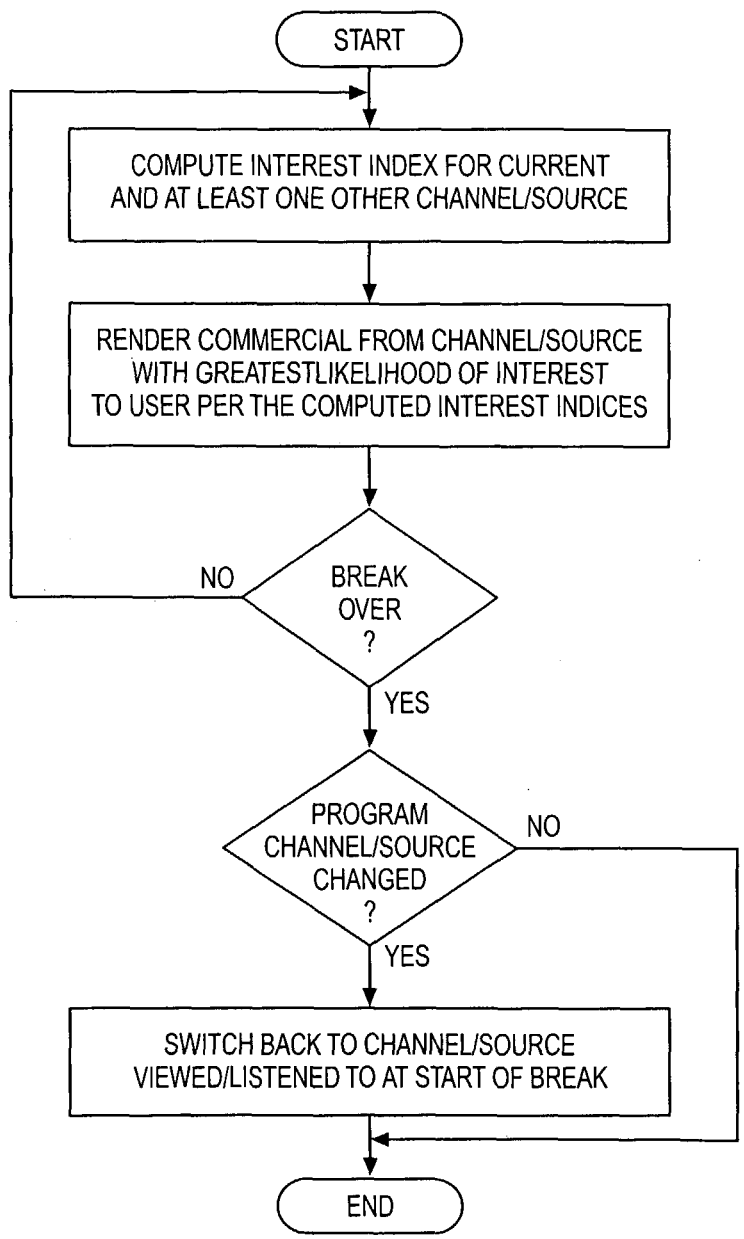
FIG. 4 is a flow chart illustrating the rendering step of FIG. 2 in further detail in accordance with another embodiment.

Referring now to FIG. 4, wherein a flow chart illustrating step 206 in accordance with another embodiment of the present invention is shown. For the illustrated embodiment, entertainment system 100 is equipped with the capability of receiving commercials from one or more channels/sources at the same time. However, for ease of understanding, the embodiment will be described with each commercial having only a single version as in the prior art. At step 204, similar to the earlier described multi-version embodiment, rendering subsystem 104 first computes interest potential indices, using user characteristics gathered and maintained by user characteristic subsystem 106, except the computation is performed for multiple commercials as opposed to multiple versions of a commercial. Then, at step 404, rendering subsystem 104 renders the commercial with the greatest likelihood of interest to the user, per the computed interest potential indices.

At step 402, rendering system 104 includes commercials from as many channels/sources that are also at commercial breakpoints as entertainment system 100 is capable of providing, and rendering system 104 is capable of handling. Those skilled in the art will appreciate that it is actually quite common, especially for television programming, for multiple channels/sources to be at commercial breakpoints at the same time. Furthermore, the number of channels/sources entertainment system 100 can provide and rendering subsystem 104 can handle is substantially an implementation dependent resource question. At step 404, if rendering subsystem 104 elects to render a commercial from another channel/source, for the illustrated embodiment, rendering subsystem 104 switches to the other channel/source.

Still referring to FIG. 4, at step 406, rendering system 104 monitors for the end of commercial break for the channel/source the user was viewing/listening. Note that after one pass over step 404, rendering system 104 may or may not have switched channel/source. Rendering subsystem 104 continues to perform steps 402 and 404 as long as the channel/source the user was viewing/listening is still in commercial break. However, upon detecting that the commercial break is over for the channel/source the user was viewing/listening, rendering subsystem 104 further determines whether it has switched channel/source, step 408. If rendering system 104 did not switch channel/source, no further action is required. However, if rendering system 104 has switched channel/source, for the illustrated embodiment, rendering system 104 switches back to the channel/source the user was viewing/listening, step 410.

Note that even for any particular commercial break period, the commercials provided by an entertainment programming provider may or may not be rendered, the provider will nevertheless benefit from the present invention in the long run, as together the selective rendering and automatic switch back provide a greater likelihood of maintaining the interest of the user, and thereby keeping the user remain tuned to the entertainment program.

In an alternate embodiment, entertainment system 100 is further equipped with the capability of saving previously rendered commercials that are of interest to the user, and rendering subsystem 104 includes these saved previously rendered commercials in its commercial selection determination. However, rendering subsystem 104 applies an incrementing weight to their interest potential indices, proportional to their age since their last rendering. That is, a full weight is given to a "very old" previously rendered commercial of interest to the user, and a relatively small weight is given to a relatively young previously rendered commercial of interest to the user. In one embodiment, rendering subsystem 104 further saves the previously computed interest potential indices as well as the previously rendered commercials of interest to the user, thereby eliminating the need of having to re-compute the interest potential indices.

Figure 5:
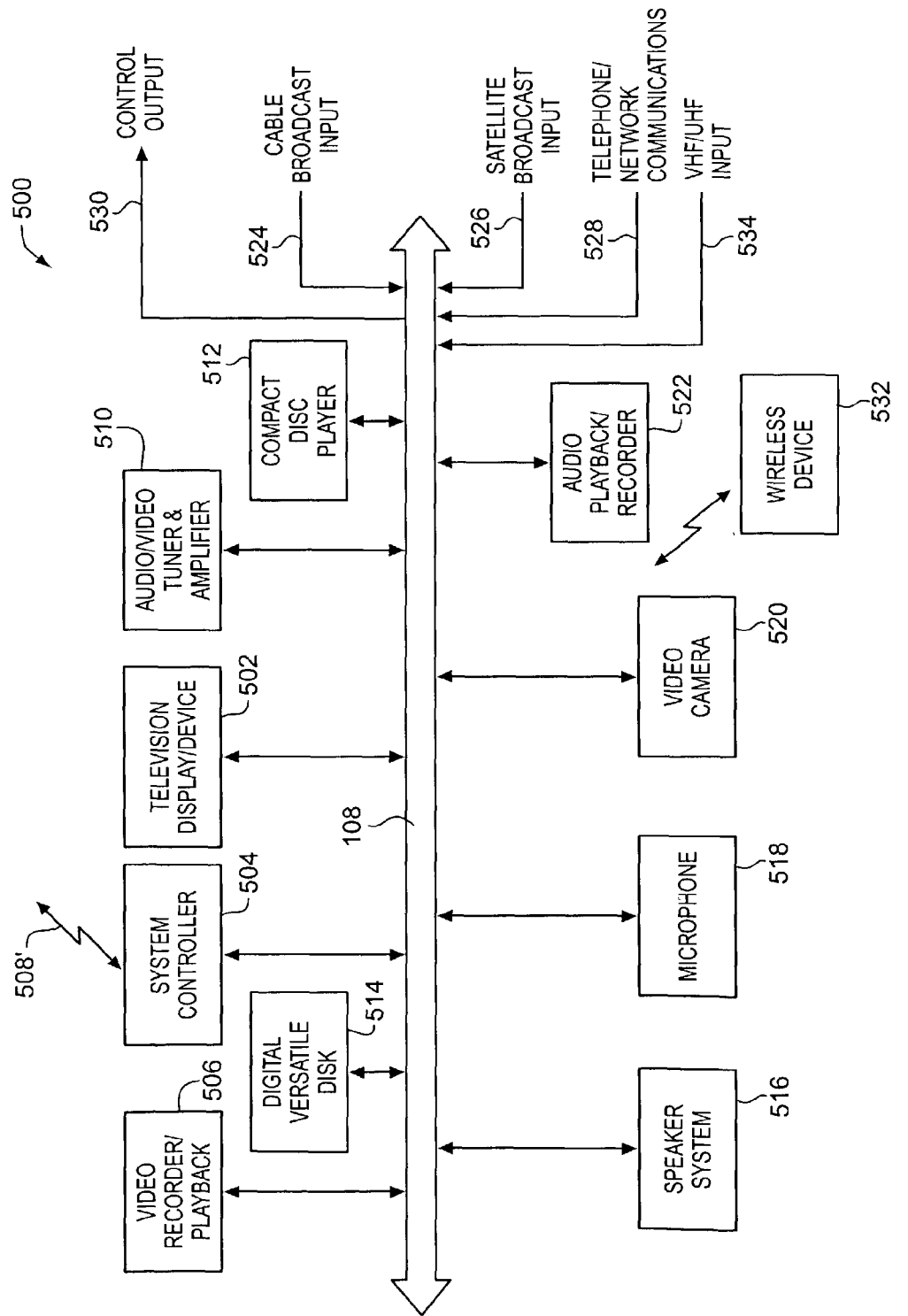
FIG. 5 is a block diagram illustrating the system components of an exemplary entertainment system in which one embodiment of the present invention may be practiced.

FIG. 5 is a block diagram illustrating an exemplary entertainment system suitable for use to practice the present invention. Exemplary entertainment system 500 includes television/display device 502, video recorder/playback device 506, digital video disk (DVD, also referred to as digital versatile disk) recorder/playback device 514, audio/video tuner and/or amplifier 510, audio playback/recorder device 522, and compact disc (CD) player 512, all coupled to a common input/output (I/O) bus 508. Each of these elements performs its conventional functions known in the art. Their constitutions are well known, accordingly will not be individually further described. However, it is to be appreciated that the use of the common I/O bus 508 is for ease of explanation only, and that a number of alternative means of routing input and output signals may be beneficially employed. For example, audio input and output could be routed with an appropriate number of independent audio "patch" cables, video signals may be routed with independent coaxial cables, and control signals may be routed along a two-wire serial line, or through infrared (IR) communication signals or radio frequency (RF) communication signals. By way of further example, audio, video, and/or control signals may also be routed along one or more buses in accordance with the Universal Serial Bus Specification, Revision 1.0 (Jan. 15, 1996), or the High Performance Serial Bus IEEE Standard 1394, IEEE std. 1394-1995, draft 8.0v3, approved Dec. 12, 1995.

Still referring to FIG. 5, exemplary entertainment system 500 further includes speaker system 516, microphone 518, video camera 520 and a wireless input/output control device 532. In one embodiment, wireless I/O control device 532 is an entertainment system remote control unit which communicates with the components of system 500 through IR signals. In another embodiment, wireless I/O control device 532 may be a wireless keyboard and/or cursor control device that communicates with the components of system 500 through IR signals or RF signals. In yet another embodiment, wireless I/O control device 532 may be an IR or RF remote control device similar in appearance to a typical entertainment system remote control with the added feature of a track-ball or other cursor control mechanism that allows a user to position a cursor on a display of system 500. Similarly, these elements also perform their conventional functions known in the art. Their constitutions are well known, and will not be further described.

At the core of system 500 is system controller 504 incorporated with the teachings of the present invention, and configured to control a variety of features associated with the system components to effectuate the customized commercial rendering of the present invention. As depicted, system controller 504 is coupled to each of the system components, as necessary, through I/O bus 508. In one embodiment, in addition to or in place of I/O bus 508, system controller 504 may be configured with a wireless communications transmitter (or transceiver), which is capable of communicating with the system components via IR signals or RF signals 508'. Regardless of the control medium, system controller 504 is configured to control each of the entertainment system components of system 500, although it is understood that each of the components may be individually controlled with wireless I/O device 532.

As shown, exemplary entertainment system 500 can be configured to receive entertainment programming via a wide variety of transport media. In one embodiment, system 500 receives entertainment programming input via any or all of the following transport media: cable broadcast 524, satellite broadcast 526 (e.g., via a satellite dish), very high frequency (VHF) or ultra high frequency (UHF) radio frequency communication of the broadcast networks 534 (e.g., via an aerial antenna), and/or the telephone/computer network interface 528. Further, it will be appreciated by those skilled in the art that cable broadcast input 524, satellite broadcast input 526 and VHF/UHF input 534 may include analog and/or digital programming. Additionally, entertainment programming may be configured to receive entertainment programming from a CD-ROM, DVD, or other digital or analog storage device via a playback device of system 500 (e.g., DVD recorder/playback device 514). The Internet, an entertainment network, or other network may also provide entertainment programming, via, for example, interface 528.

In addition to the entertainment programming inputs, exemplary entertainment system 500 may also be configured to provide a number of general purpose control outputs 530 to control any number of devices. In one embodiment, for example, as system controller 504 configures system 500 to display a movie, it may also dim the lights in the room to a predetermined level to further enhance the viewing environment. Control circuitry which allows a computing device to control, for example, lighting, thermostat settings, and other household appliances (via, for example, the electrical wiring in a house) are well known in the art and thus will not be described further.

Except for the incorporated teachings of the present invention, system controller 504 is intended to represent a broad category of computing devices known in the art. An example of such a computing device is a desktop computer system equipped with a high performance microprocessor(s), such as the Pentium® processor, Pentium® Pro processor, or Pentium® II processor manufactured by and commonly available from Intel Corporation of Santa Clara, Calif. Another example of such a computing device is an Internet "appliance" device, such as a WebTV™ Internet Terminal available from Sony Electronics Inc. of Park Ridge, N.J., or Philips Consumer Electronics Company of Knoxville, Tenn. It is to be appreciated that the housing size and design for system controller 504 may be altered, allowing it to better visually fit into system 500. Regardless of the particular embodiment, system controller 504 may also be referred to as a "convergence system" designed to integrate the world of entertainment systems and computing platforms to achieve the beneficial results of customized commercial rendering discussed earlier.

Although the present invention may be practiced in the context of the exemplary embodiment presented, those skilled in the art will appreciate that the present invention may be practiced in a variety of alternate embodiments. By way of example, devices may be added to system 500, or devices (e.g., video camera 520, microphone 518, DVD recorder/playback device 514, etc.) may be removed from system 500. Furthermore, it is to be appreciated that the several entertainment system components depicted in FIG. 5 can be beneficially combined. By way of example, system controller 504 could be integrated into television/display device 502, DVD recorder/playback device 514, or audio/video tuner and amplifier 510.

Figure 6:
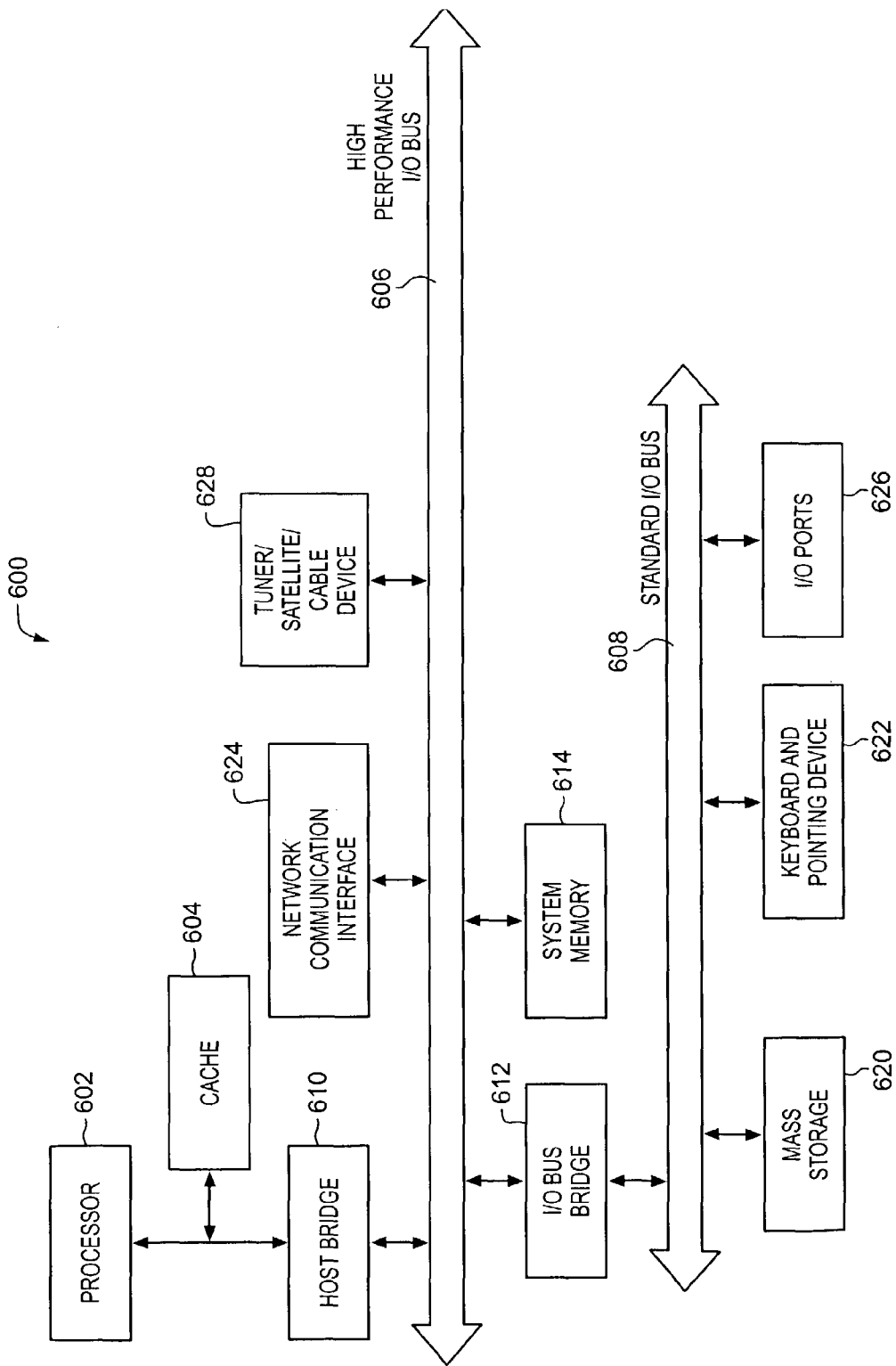
FIG. 6 is a block diagram illustrating the architecture of a system controller according to one embodiment of the present invention.

FIG. 6 illustrates one embodiment of a computing device suitable for use with the present invention. According to one implementation, system controller 504 of FIG. 5 is a computing device 600 of FIG. 6. In the illustrated embodiment, device 600 includes processor 602 and cache memory 604 coupled to each other as shown. Additionally, device 600 includes high performance input/output (I/O) bus 606 and standard I/O bus 608. Host bridge 610 couples processor 602 to high performance I/O bus 606, whereas I/O bus bridge 612 couples the two buses 606 and 608 to each other. Coupled to bus 606 are network/communication interface 624 and system memory 614. Coupled to bus 608 is mass storage 620, keyboard and pointing device 622, and I/O ports 626. Collectively, these elements are intended to represent a broad category of hardware systems, including but not limited to general purpose computer systems based on the Pentium® processor, Pentium® Pro processor, or Pentium® II processor, manufactured by Intel Corporation of Santa Clara, Calif.

In one embodiment, various electronic devices are also coupled to high performance I/O bus 606. As illustrated, analog tuner/digital satellite/cable devices 628, are also coupled to high performance I/O bus 606 to allow device 600 to "tune" to various programming input channels.

These elements 602-628 perform their conventional functions known in the art. In particular, network/communication interface 624 is used to provide communication between device 600 and any of a wide range of conventional networks, such as an Ethernet, token ring, the Internet, etc. It is to be appreciated that the circuitry of interface 624 is dependent on the type of network the device 600 is being coupled to.

Mass storage 620 is used to provide permanent storage for the data and programming instructions, whereas system memory 614 is used to provide temporary storage for the data and programming instructions when executed by processor 602. I/O ports 626 are one or more serial and/or parallel communication ports used to provide communication between additional peripheral devices which may be coupled to device 600.

It is to be appreciated that various components of device 600 may be re-arranged. For example, cache 604 may be on-chip with processor 602. Alternatively, cache 604 and processor 602 may be packaged together as a "processor module", with processor 602 being referred to as the "processor core". Furthermore, certain implementations of the present invention may not require nor include all of the above components. For example, keyboard and pointing device 622, and/or network/communication interface 624 may not be included in device 600. Additionally, the peripheral devices shown coupled to standard I/O bus 608 may be coupled to high performance I/O bus 606; in addition, in some implementations only a single bus may exist with the components of device 600 being coupled to the single bus. Furthermore, additional components may be included in device 600, such as additional processors, storage devices, or memories.

In one embodiment, the method and apparatus customized commercial rendering described above, including the steps illustrated in FIGS. 2-4 as well as user characteristic gathering subsystem of FIG. 1 and the user characteristics gathered, is implemented as a series of software routines run by device 600 of FIG. 6. In this embodiment, the various steps described with references to FIG. 3-4 are performed by a series of software routines. These software routines comprise a plurality or series of instructions to be executed by a processor in a hardware system, such as processor 602. Initially, the series of instructions and the user characteristic data are stored on a storage device, such as mass storage 620. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/communication interface 624. The instructions and data are copied from the storage device, such as mass storage 620, into memory 614 and then accessed and executed by processor 602. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. By way of another example, steps of FIGS. 3-4 could be performed by combinatorial logic implemented in one or more ASICs of an additional circuit board for addition to device 600.

Thus, a method and apparatus for customized commercial rendering has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:
1. A method comprising:
  receiving entertainment programming broadcast to a user at a user set-top box;

receiving commercials broadcast to a user at a user set-top box, the commercials having characteristics;
saving at least a portion of the broadcast commercials at the user set-top box for selectively rendering later;
gathering user characteristics at the set-top box and associating them with a user of the set-top box;
computing interest potential indices for the saved commercials at the set-top box by comparing the gathered user characteristics associated with the user against the characteristics of the respective commercial and adding up the number of matching characteristics, the total number of matching characteristics for a particular commercial and a particular user providing the interest potential index for that particular commercial and user combination;
saving the computed interest potential indices for the user in association with each respective saved commercial at the user set-top box;
selecting saved commercials in accordance with the saved computed interest potential indices; and
rendering the entertainment programming broadcast interposed with the selected saved commercials to the user.

2. The method of claim 1, wherein the commercials comprise a plurality of different versions of a commercial.

3. The method of claim 1, wherein computing comprises adding up a number of matching characteristics between a commercial and the characteristics associated with the user using a simple unweighted scheme.

4. The method of claim 1, wherein selectively rendering includes selecting one of a plurality of received commercials and commercials to be broadcast based on the various received commercials' interest potential to the user, with the interest potential being determined based on the computed interest indices, the computed interest indices being based on the one or more characteristics associated with the user.

5. The method of claim 1, wherein rendering the commercial comprises rendering the commercial using a first channel, the method further comprising conditionally restoring a second channel as a current channel after rendering the commercial.

6. The method of claim 1, wherein the one or more characteristics associated with the user comprises selected ones of profile characteristics, preference information and entertainment programming consumption characteristics.

7. The method of claim 6, wherein the one or more characteristics associated with the user include profile characteristics and entertainment programming consumption characteristics.

8. The method of claim 1, wherein computing comprises computing at the user set-top box.

9. The method of claim 1, wherein selectively rendering the commercials comprises selecting commercials from among commercials currently broadcast on a plurality of different channels and the saved commercials.

10. The method of claim 1, further comprising detecting a commercial breakpoint for rendering the selected commercial and wherein rendering comprises rendering the selected commercial at the detected commercial breakpoint.

11. A non-transitory machine-readable medium having stored thereon data representing sequences of instructions which, when executed by a machine, cause the machine to perform operations comprising:
receiving entertainment programming broadcast to a user at a user set-top box;
receiving commercials broadcast to a user at a user set-top box, the commercials having characteristics;
saving at least a portion of the broadcast commercials at the user set-top box for selectively rendering later;
gathering user characteristics at the set-top box and associating them with a user of the set-top box;
computing interest potential indices for the saved commercials at the set-top box by comparing the gathered user characteristics associated with the user against the characteristics of the respective commercial and adding up the number of matching characteristics, the total number of matching characteristics for a particular commercial and a particular user providing the interest potential index for that particular commercial and user combination;
saving the computed interest potential indices for the user in association with each respective saved commercial at the user set-top box;
selecting saved commercials in accordance with the saved computed interest potential indices; and
rendering the entertainment programming broadcast interposed with the selected saved commercials to the user.

12. The medium of claim 11, wherein the commercials comprise a plurality of different versions of a commercial.

13. The medium of claim 11, wherein the instructions for computing interest potential indices further comprise instructions which, when executed by the machine, cause the machine to perform further operations comprising adding up a number of matching characteristics between the commercial and the characteristics associated with the user using a simple unweighted scheme.

14. The medium of claim 11, wherein the instructions for selectively rendering the commercials further comprise instructions which, when executed by the machine, cause the machine to perform further operations comprising selecting one of a plurality of received commercials and commercials to be broadcast based on the various received commercials' interest potential to the user, with the interest potential being determined based on the computed interest indices, the computed interest indices being based on the one or more characteristics associated with the user.

15. The medium of claim 11, wherein the instructions for selectively rendering the commercials further comprise instructions which, when executed by the machine, cause the machine to perform further operations comprising selecting commercials from among commercials currently broadcast on a plurality of different channels and the saved commercials.

16. The medium of claim 11, comprising instructions which, when executed by the machine, cause the machine to perform further operations comprising detecting a commercial breakpoint for rendering the selected commercial and wherein the instructions for rendering further comprise instructions which, when executed by the machine, cause the machine to perform further operations comprising rendering the selected commercial at the detected commercial breakpoint.

17. An apparatus comprising:
means for receiving entertainment programming broadcast to a user at a user set-top box;
means for receiving commercials broadcast to a user at a user set-top box, the commercials having characteristics;
means for saving at least a portion of the broadcast commercials at the user set-top box for selectively rendering later;
means for gathering user characteristics at the set-top box and associating them with a user of the set-top box;

means for computing interest potential indices for the saved commercials at the set-top box by comparing the gathered user characteristics associated with the user against the characteristics of the respective commercial and adding up the number of matching characteristics, the total number of matching characteristics for a particular commercial and a particular user providing the interest potential index for that particular commercial and user combination, using the gathered user characteristics associated with the user and the characteristics of the respective commercial;

means for saving the computed interest potential indices for the user in association with each respective saved commercial at the user set-top box;

selecting saved commercials in accordance with the saved computed interest potential indices; and means for rendering the entertainment programming broadcast interposed with the selected saved commercials to the user.

18. The apparatus of claim 17, wherein the commercials comprise a plurality of different versions of a commercial.

19. The apparatus of claim 17, wherein the means for computing comprises means for adding up a number of matching characteristics between a commercial and the characteristics associated with the user using a simple unweighted scheme.

20. The apparatus of claim 17, wherein the means for selectively rendering selects one of a plurality of received commercials and commercials to be broadcast based on the various received commercials' interest potential to the user, with the interest potential being determined based on the computed interest indices, the computed interest indices being based on the one or more characteristics associated with the user.

21. The apparatus of claim 17, wherein the one or more characteristics associated with the user comprise selected ones of profile characteristics, preference information and entertainment programming consumption characteristics.

22. The apparatus of claim 17, further comprising means for detecting a commercial breakpoint for rendering the selected commercial and wherein the means for rendering comprises rendering the selected saved commercial at the detected commercial breakpoint.

23. The apparatus of claim 17 wherein the means for receiving, the means for saving, the means for computing, and the means for selectively rendering are components of a single user entertainment system at a single location.

24. The apparatus of claim 17 wherein the means for receiving comprises a receiver of a user entertainment system, wherein the means for saving the commercials and the computed interest potential indices comprise a storage subsystem of the user entertainment system, and wherein the means for computing interest potential indices and the means for selectively rendering comprise a rendering subsystem of the user entertainment system.

25. An entertainment system comprising:

a user characteristics subsystem at a set-top box to gather user characteristics at a user set-top box, to associate them with a user, and to supply the gathered characteristics;

a rendering subsystem at the set-top box coupled to the user characteristics subsystem to compute interest potential indices for a plurality of received and saved commercials using the gathered user characteristics and the characteristics of the respective commercial by adding up the number of matching characteristics, the total number of matching characteristics for a particular commercial and a particular user providing the interest potential index for that particular commercial and user combination, to select saved commercials in accordance with the computed saved interest potential indices, and to render entertainment programming to the user including saved commercials interposed in the entertainment programming, the commercials being rendered selectively in accordance with the interest potential indices so that commercials with the greatest likelihood of interest to the user are selected for rendering; and a storage subsystem at the set-top box to save at least a portion of the received commercials for later selective rendering by the rendering subsystem and to save the computed interest potential indices for the user in association with each respective saved commercial.

26. The entertainment system of claim 25, wherein the one or more characteristics associated with the user comprise selected ones of profile characteristics, preference information and entertainment programming consumption characteristics.

27. The entertainment system of claim 25, wherein the rendering subsystem computes interest potential indices by adding up a number of matching characteristics between the commercial and the characteristics associated with the user using a simple unweighted scheme.

28. The entertainment system of claim 25, wherein the rendering subsystem detects a commercial breakpoint and selects a saved or broadcast commercial for rendering at the commercial breakpoint in accordance with the computed interest potential indices.

29. The entertainment system of claim 25, wherein the user characteristics subsystem, the rendering subsystem, and the storage subsystem are components of a single user entertainment system at a single location.

30. The method of claim 1, wherein computing comprises using the gathered user characteristics associated with the user and the characteristics of the respective commercial as input factors in a predetermined probabilistic model.

31. The medium of claim 11, wherein the instructions for computing interest potential indices further comprise instructions which, when executed by the machine, cause the machine to perform further operations comprising using the gathered user characteristics associated with the user and the characteristics of the respective commercial as input factors in a predetermined probabilistic model.

32. The apparatus of claim 17, wherein the means for computing comprises means for using the gathered user characteristics associated with the user and the characteristics of the respective commercial as input factors in a predetermined probabilistic model.

33. The entertainment system of claim 25, wherein the rendering subsystem computes interest potential indices by using the gathered user characteristics associated with the user and the characteristics of the respective commercial as input factors in a predetermined probabilistic model.

* * * * *